US011606127B2

United States Patent
Baghel et al.

(10) Patent No.: US 11,606,127 B2
(45) Date of Patent: Mar. 14, 2023

(54) TECHNIQUES FOR SIDELINK CHANNEL STATE INFORMATION REPORTING

(71) Applicant: QUALCOMM Incorporated, San Diego, CA (US)

(72) Inventors: Sudhir Kumar Baghel, Hillsborough, NJ (US); Kapil Gulati, Belle Mead, NJ (US); Gabi Sarkis, San Diego, CA (US); Chang-Sik Choi, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,859

(22) Filed: Nov. 17, 2020

(65) Prior Publication Data

US 2021/0152226 A1 May 20, 2021

Related U.S. Application Data

(60) Provisional application No. 62/937,111, filed on Nov. 18, 2019.

(51) Int. Cl.
| | |
|---|---|
| H04B 7/06 | (2006.01) |
| H04L 5/00 | (2006.01) |
| H04W 76/11 | (2018.01) |
| H04W 80/02 | (2009.01) |
| H04L 1/00 | (2006.01) |
| H04W 72/14 | (2009.01) |

(Continued)

(52) U.S. Cl.
CPC ......... *H04B 7/0626* (2013.01); *H04B 7/0486* (2013.01); *H04B 7/0632* (2013.01); *H04L 1/0008* (2013.01); *H04L 1/1819* (2013.01); *H04L 5/0051* (2013.01); *H04W 72/14* (2013.01); *H04W 76/11* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2019/0141546 A1* | 5/2019 | Zhou | H04W 72/0413 |
| 2019/0246421 A1* | 8/2019 | Zhou | H04W 72/14 |

OTHER PUBLICATIONS

3GPP TSG RAN WG1 #98bis, Physical Layer Procedure for NR-V2X sidelink, Oct. 14-20, 2019 (Year: 2019).*

(Continued)

*Primary Examiner* — Peter Chen
*Assistant Examiner* — Jeff Banthrongsack
(74) *Attorney, Agent, or Firm* — Dalei Dong; Harrity & Harrity, LLP (57) ABSTRACT

Various aspects of the present disclosure generally relate to wireless communication. In some aspects, a target user equipment (UE) may receive a channel state information (CSI) reference signal (RS) from a source UE via a sidelink communication; determine that a lower-layer determined source identifier of the source UE is included in a set of upper-layer determined source identifiers; and transmit a CSI report in a media access control (MAC) control element (CE) as a response to the CSI RS, based at least in part on the determination that the lower-layer determined source identifier of the source UE is included in a set of upper-layer determined source identifiers. Numerous other aspects are provided.

30 Claims, 5 Drawing Sheets

(51) Int. Cl.
    *H04B 7/0456*     (2017.01)
    *H04L 1/1812*     (2023.01)

(56) References Cited

OTHER PUBLICATIONS

3GPP TSG RAN WG1 #96bis, Spreadtrum Communications, Apr. 8-12, 2019 (Year: 2019).*
International Search Report and Written Opinion—PCT/US2020/070799—ISA/EPO—dated Feb. 19, 2021.
OPPO: "Physical Layer Procedure for NR-V2X Sidelink," 3GPP Draft, 3GPP TSG RAN WG1 #98bis, R1 -1910375, Phy Layer Procedure, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051809105, 12 pages, Retrieved from the Internet: URL: https://ftp.3gpp.org/tsg_ran/WG1_RL1/TSGR1_98b/Docs/R1-1910375.zip R1-1910375 PHY layer procedure.docx [retrieved on Oct. 8, 2019] section 2.2; p. 3 sections: 2.7 and 3, p. 6-p. 7, section 8, p. 12.
Spreadtrum Communications: "Discussion on NR Sidelink Mode 1 Resource Allocation," 3GPP Draft, 3GPP TSG RAN WG1 #96bis, R1-1904795, Discussion on NR Sidelink Mode 1 Resource Allocation Final, 3rd Generation Partnership Project (3GPP), Mobile Competence Centre, 650, Route Des Lucioles, F-06921, Sophia-Antipolis Cedex, France, vol. RAN WG1. No. Xi 'an. China, Apr. 8, 2019-Apr. 12, 2019, Apr. 2, 2019 (Apr. 2, 2019), XP051707311, 6 pages, Retrieved from the Internet: URL: http://www.3gpp.org/ftp/tsg%5Fran/WG1%5FRL1/TSGR1%5F96b/Docs/R1%2D1904795%2Ezip [retrieved on Apr. 2, 2019] figure 1 sections: 2.1 and 2.2; p. 1-p. 3.

\* cited by examiner

TECHNIQUES FOR SIDELINK CHANNEL STATE INFORMATION REPORTING

CROSS-REFERENCE TO RELATED APPLICATION

This Patent Application claims priority to U.S. Provisional Patent Application No. 62/937,111, filed on Nov. 18, 2019, entitled "SIDELINK CHANNEL STATE INFORMATION REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink channel state information reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a target user equipment (UE), may include receiving a channel state information (CSI) reference signal (RS) from a source UE via a sidelink communication; determining that a lower-layer determined source identifier of the source UE is included in a set of upper-layer determined source identifiers; and transmitting a CSI report in a media access control (MAC) control element (CE) as a response to the CSI RS, based at least in part on the determination that the lower-layer determined source identifier of the source UE is included in a set of upper-layer determined source identifiers.

In some aspects, a UE for wireless communication may include memory and one or more processors operatively coupled to the memory. The memory and the one or more processors may be configured to receive a CSI RS from a source UE via a sidelink communication; determine that a lower-layer determined source identifier of the source UE is included in a set of upper-layer determined source identifiers; and transmit a CSI report in a MAC CE as a response to the CSI RS, based at least in part on the determination that the lower-layer determined source identifier of the source UE is included in a set of upper-layer determined source identifiers.

In some aspects, a non-transitory computer-readable medium may store one or more instructions for wireless communication. The one or more instructions, when executed by one or more processors of a device, may cause the one or more processors to receive a CSI RS from a source UE via a sidelink communication; determine that a lower-layer determined source identifier of the source UE is included in a set of upper-layer determined source identifiers; and transmit a CSI report in a MAC CE as a response to the CSI RS, based at least in part on the determination that the lower-layer determined source identifier of the source UE is included in a set of upper-layer determined source identifiers.

In some aspects, an apparatus for wireless communication may include means for receiving a CSI RS from a source UE via a sidelink communication; means for determining that a lower-layer determined source identifier of the source UE is included in a set of upper-layer determined source identifiers; and means for transmitting a CSI report in a MAC CE as a response to the CSI RS, based at least in part on the determination that the lower-layer determined source identifier of the source UE is included in a set of upper-layer determined source identifiers.

In some aspects, the CSI report includes information identifying at least one of a hybrid automatic repeat request process identifier for the CSI RS, a channel quality indicator, a rank indicator, or a slot number on which the CSI RS was received.

In some aspects, the method includes identifying a sidelink grant for transmission of the MAC CE, wherein the sidelink grant includes resources for the CSI report and a corresponding subheader, and transmitting the CSI report includes transmitting the CSI report via the sidelink grant for transmission of the MAC CE in accordance with a logical channel prioritization.

In some aspects, the method includes activating a sidelink CSI report timer in connection with the lower-layer determined source identifier based at least in part on the transmission of the CSI report.

In some aspects, the transmission of the CSI report includes transmitting the CSI report based at least in part on a logical channel prioritization.

In some aspects, the logical channel prioritization includes the CSI report being prioritized above a sidelink control channel and a corresponding sidelink transport channel.

In some aspects, the method includes requesting a grant for transmitting the CSI report; receiving the grant for transmitting the CSI report based at least in part on requesting the grant, wherein the grant includes resources for transmitting the MAC CE and a corresponding MAC subheader; and transmitting the CSI report using the grant.

In some aspects, a transmission of the CSI report using the grant includes padding bits to fill the grant.

In some aspects, the method includes determining a transmission window for transmitting the CSI report; and processing the CSI report in accordance with the transmission window.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
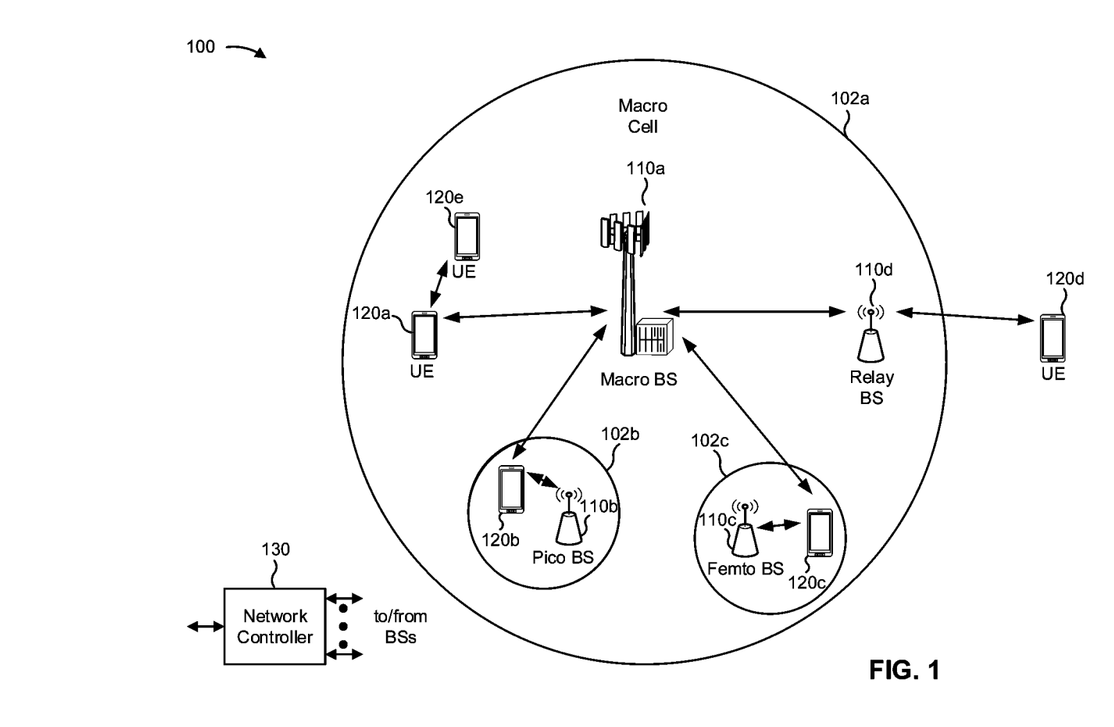
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
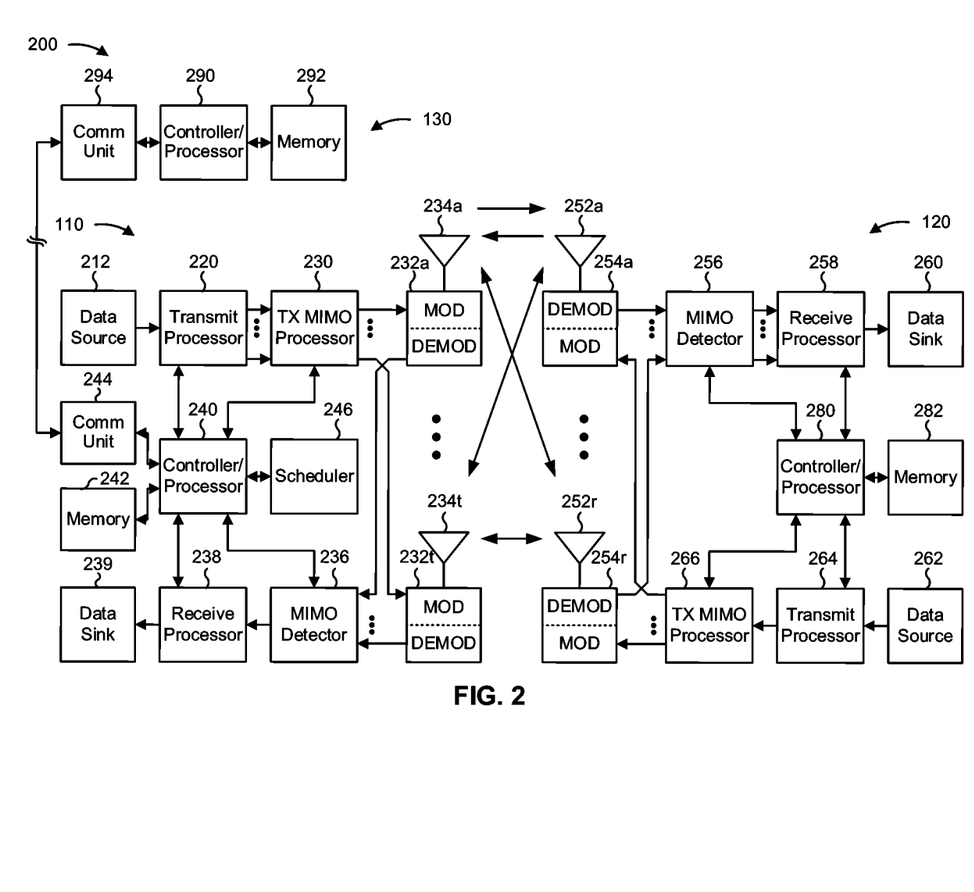
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink channel state information (CSI) reporting, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for receiving a CSI reference signal (RS) from a source UE via a sidelink communication, means for determining that a lower-layer determined source identifier of the source UE is included in a set of upper-layer determined source identifiers, means for transmitting a CSI report in a media access control (MAC) control element (CE) as a response to the CSI RS, based at least in part on the determination that the lower-layer determined source identifier of the source UE is included in a set of upper-layer determined source identifiers, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communication systems, a UE may receive a CSI RS from a BS and may perform a measurement of the CSI RS to determine a network characteristic. Based at least in part on performing the measurement of the CSI RS, the UE may provide a CSI report as a response to the CSI RS. The CSI report may include information regarding the network characteristic, such as a channel quality indicator (CQI), a rank indicator (RI), and/or the like.

However, in other communication systems, such as device-to-device communication systems (e.g., V2X, V2V, and/or the like), the UE may receive the CSI RS from other UEs rather than (or in addition to) from a BS. In this case, a UE that transmits the CSI RS may be termed a source UE, and a UE that receives the CSI RS may be termed a target UE. However, when a source UE transmits a CSI RS, many target UEs may detect the CSI RS. If every target UE that detects the CSI RS attempts to provide a CSI report, excessive network traffic may result. Similarly, a single target UE may receive CSI RSs from many source UEs, which may result in excessive utilization of processing resources to respond to the CSI RSs. Furthermore, when many UEs are transmitting and receiving CSI reports, some CSI reports may be duplicative of other CSI reports, thereby resulting in inefficient utilization of network resources.

Some aspects described herein enable sidelink CSI reporting. For example, a target UE may determine, at an upper layer (e.g., a MAC layer, a radio resource control (RRC) layer, and/or the like), a set of source UEs for which to provide CSI reporting when a CSI RS is received and may, at a lower layer (e.g., a physical layer), detect receipt of a CSI RS from a source UE and determine that the source UE is included in the set of source UEs for which the target UE to provide CSI reporting. In this case, based at least in part on the source UE being included in the set of source UEs for which the target UE is to perform CSI reporting, the target UE may generate and transmit a CSI report to the source UE. In this way, the source UE and the target UE enable sidelink CSI reporting without excessive network traffic and/or inefficient utilization of network resources.

Figure 3:
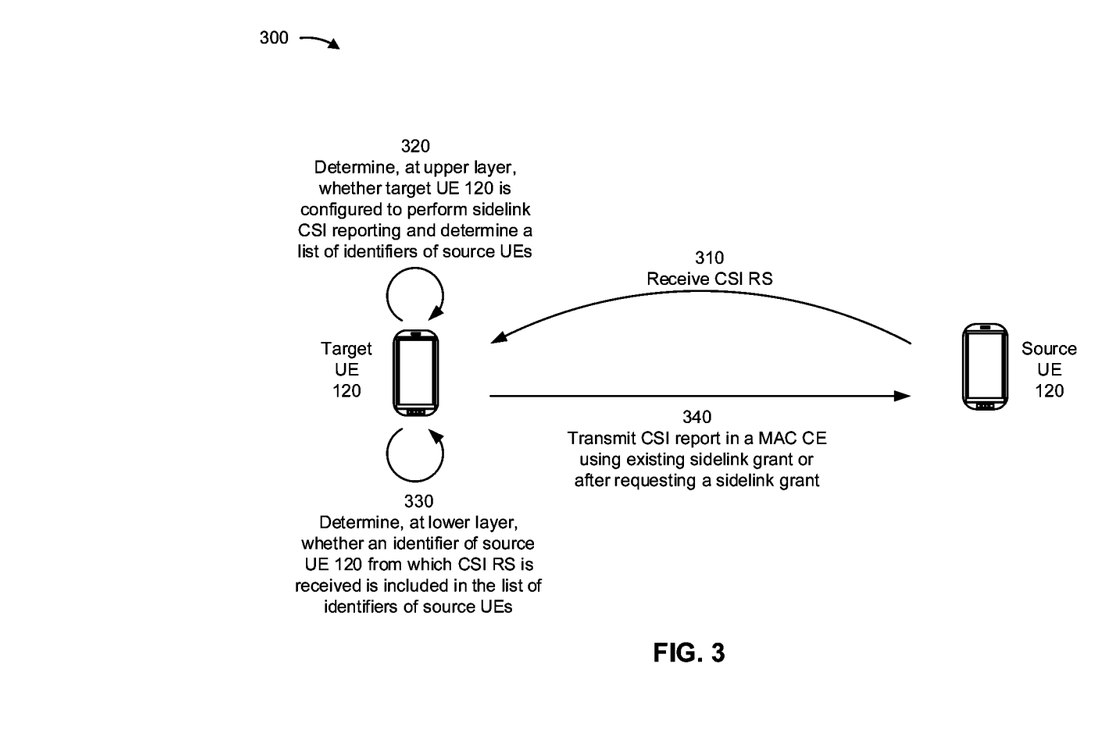
FIG. 3 is a diagram illustrating an example of sidelink channel state information reporting, in accordance with various aspects of the present disclosure.

FIG. 3 is a diagram illustrating an example 300 of sidelink channel state information reporting, in accordance with various aspects of the present disclosure. As shown in FIG. 3, example 300 includes a source UE 120 and a target UE 120.

As further shown in FIG. 3, and by reference number 310, target UE 120 may receive a CSI RS. For example, target UE 120 may receive the CSI RS from a source UE 120. In some aspects, target UE 120 may receive CSI RSs from a plurality of source UEs 120. For example, when operating in a V2X deployment, a V2V deployment, and/or the like, a plurality of UEs 120 (e.g., source UEs 120) may transmit CSI RSs to enable measurements of channel conditions, and target UE 120 may receive one or more of the CSI RSs. In some aspects, target UE 120 may perform a measurement of the CSI RS and may determine a characteristic of a channel based at least in part on the measurement. For example, target UE 120 may determine a CQI value, an RI value, and/or the like.

As further shown in FIG. 3, and by reference number 320, target UE 120 may determine, at an upper layer, whether target UE 120 is configured to perform sidelink CSI reporting. Additionally, or alternatively, target UE 120 may determine, at the upper layer, a list of identifiers of source UEs 120 for which target UE 120 is to perform CSI reporting. For example, when target UE 120 is configured, at an upper layer, to perform sidelink CSI reporting, target UE 120 may determine a list of identifiers of source UEs 120 for which target UE 120 is to perform CSI reporting. In some aspects, the list of identifiers may correspond to all source UEs 120 within a threshold proximity of target UE 120. In some aspects, the list of identifiers may be a subset of source UEs 120 within the threshold proximity of target UE 120.

As further shown in FIG. 3, and by reference number 330, target UE 120 may determine, at a lower layer, whether an identifier of source UE 120 is included in the list of identifiers of source UEs 120 for which target UE 120 is to perform CSI reporting. For example, at a lower layer, target UE 120 may detect reception of the CSI RS and may determine, based at least in part on information included in the CSI RS identifying source UE 120, whether an identifier of source UE 120 is included in the upper layer-determined list of source UEs 120 for which target UE 120 is to perform CSI reporting. In this case, when an identifier of source UE 120 is not included in the list of identifiers, target UE 120 may determine to forgo transmitting a CSI report as a response to the CSI RS. Additionally, or alternatively, when an identifier of source UE 120 is included in the list of identifiers, target UE 120 may determine to transmit the CSI report as a response to the CSI RS.

As further shown in FIG. 3, and by reference number 340, target UE 120 may transmit a CSI report in a MAC CE using an existing sidelink grant or after requesting a sidelink grant. For example, when a medium access control (MAC) entity of target UE 120 has a sidelink grant for transmission, the MAC entity of target UE 120 may determine whether allocated resources of the sidelink grant are sufficient to accommodate a MAC control element (CE) to convey a CSI report, a corresponding subheader, and/or the like. In this case, if the allocated resources are sufficient, target UE 120 may cause a multiplexing and assembly procedure to generate a MAC CE based at least in part on a measurement of the CSI RS performed at a physical layer, and may transmit a CSI report in the MAC CE to source UE 120 to enable source UE 120 to control one or more transmission parameters. In some aspects, target UE 120 may include padding bits to fill the grant (e.g., when the grant is larger than the CSI RS and corresponding subheader).

Additionally, or alternatively, when the sidelink grant is not sufficient or when the MAC entity determines that there is not an existing sidelink grant for transmission, the MAC entity of target UE 120 may transmit a request for a sidelink grant and may receive a response identifying a sidelink grant with allocated resources for transmitting the CSI report on a sidelink. In some aspects, target UE 120 may include an indicator of a measurement or a channel condition in the CSI report. For example, target UE 120 may include information identifying a CQI, an RI, and/or the like. Additionally, or alternatively, target UE 120 may include information identifying a hybrid automatic repeat request (HARM) process identifier, a slot number on which the CSI RS was received, and/or the like.

In some aspects, target UE 120 may determine whether to transmit the CSI report using a sidelink grant based at least in part on a prioritization. For example, target UE 120 may prioritize a set of logical channels, such that a sidelink CSI report MAC CE is prioritized over a sidelink control channel and/or a sidelink transport channel. In some aspects, target UE 120 may process the CSI report in accordance with a transmission timeline requirement. For example, target UE 120 may determine an amount of time before an end of an upper layer-configured time window in which the CSI RS is received. In this case, target UE 120 may indicate the upper layer-configured time window to lower layers in order to enable prioritization of processing and transmission of the CSI RS report. In this way, target UE 120 enables prioritization of use of a limited set of allocated resources, such that source UE 120 may perform transmission control.

As indicated above, FIG. 3 is provided as an example. Other examples may differ from what is described with respect to FIG. 3.

Figure 4:
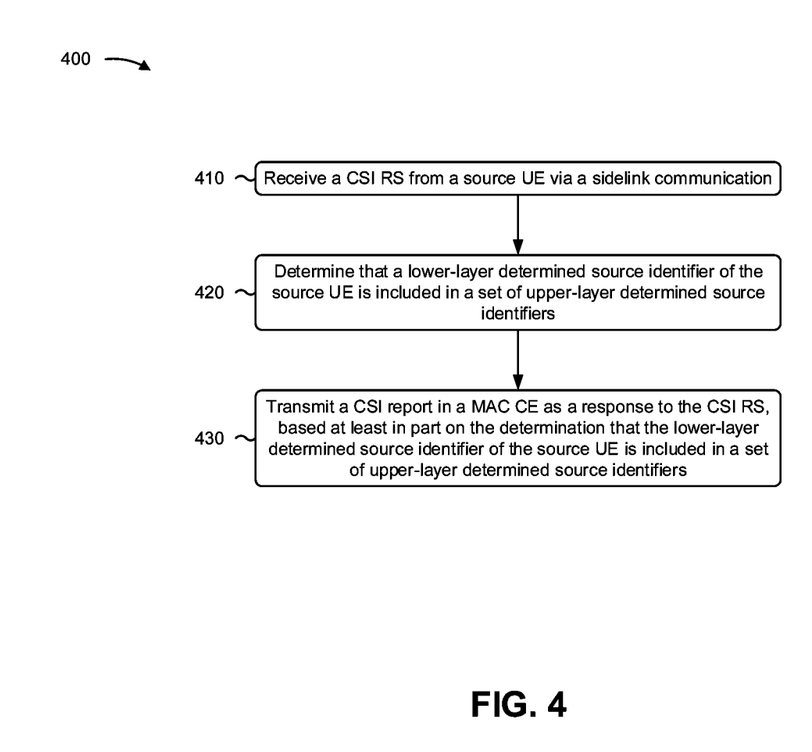
FIG. 4 is a diagram illustrating an example process performed, for example, by a user equipment, in accordance with various aspects of the present disclosure.

FIG. 4 is a diagram illustrating an example process 400 performed, for example, by a target UE, in accordance with various aspects of the present disclosure. Example process 400 is an example where the target UE (e.g., UE 120 and/or the like) performs operations associated with sidelink channel state information reporting.

As shown in FIG. 4, in some aspects, process 400 may include receiving a CSI RS from a source UE via a sidelink communication (block 410). For example, the target UE (e.g., using antenna 252, DEMOD 254, MIMO detector 256, receive processor 258, controller/processor 280, and/or the like) may receive a CSI RS from a source UE via a sidelink communication, as described above.

As further shown in FIG. 4, in some aspects, process 400 may include determining that a lower-layer determined source identifier of the source UE is included in a set of upper-layer determined source identifiers (block 420). For example, the target UE (e.g., using controller/processor 280 and/or the like) may determine that a lower-layer determined source identifier of the source UE is included in a set of upper-layer determined source identifiers, as described above.

As further shown in FIG. 4, in some aspects, process 400 may include transmitting a CSI report in a MAC CE as a response to the CSI RS, based at least in part on the determination that the lower-layer determined source identifier of the source UE is included in a set of upper-layer determined source identifiers (block 430). For example, the target UE (e.g., using controller/processor 280, transmit processor 264, TX MIMO processor 266, MOD 254, antenna 252, and/or the like) may transmit a CSI report in a MAC CE as a response to the CSI RS, based at least in part on the determination that the lower-layer determined source identifier of the source UE is included in a set of upper-layer determined source identifiers, as described above.

Process 400 may include additional aspects, such as any single aspect or any combination of aspects described below and/or in connection with one or more other processes described elsewhere herein.

In a first aspect, the CSI report includes information identifying at least one of a hybrid automatic repeat request process identifier for the CSI RS, a channel quality indicator, a rank indicator, or a slot number on which the CSI RS was received.

In a second aspect, alone or in combination with the first aspect, process 400 includes identifying a sidelink grant for transmission of the MAC CE, wherein the sidelink grant includes resources for the CSI report and a corresponding subheader, and transmitting the CSI report includes transmitting the CSI report via the sidelink grant for transmission of the MAC CE in accordance with a logical channel prioritization.

In a third aspect, alone or in combination with one or more of the first and second aspects, process 400 includes activating a sidelink CSI report timer in connection with the lower-layer determined source identifier based at least in part on the transmission of the CSI report.

In a fourth aspect, alone or in combination with one or more of the first through third aspects, the transmission of the CSI report includes transmitting the CSI report based at least in part on a logical channel prioritization.

In a fifth aspect, alone or in combination with one or more of the first through fourth aspects, the logical channel prioritization includes the CSI report being prioritized above a sidelink control channel and a corresponding sidelink transport channel.

In a sixth aspect, alone or in combination with one or more of the first through fifth aspects, process 400 includes requesting a grant for transmitting the CSI report; receiving the grant for transmitting the CSI report based at least in part on requesting the grant, wherein the grant includes resources for transmitting the MAC CE and a corresponding MAC subheader; and transmitting the CSI report using the grant.

In a seventh aspect, alone or in combination with one or more of the first through sixth aspects, a transmission of the CSI report using the grant includes padding bits to fill the grant.

In an eighth aspect, alone or in combination with one or more of the first through seventh aspects, process 400 includes determining a transmission window for transmitting the CSI report; and processing the CSI report in accordance with the transmission window.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
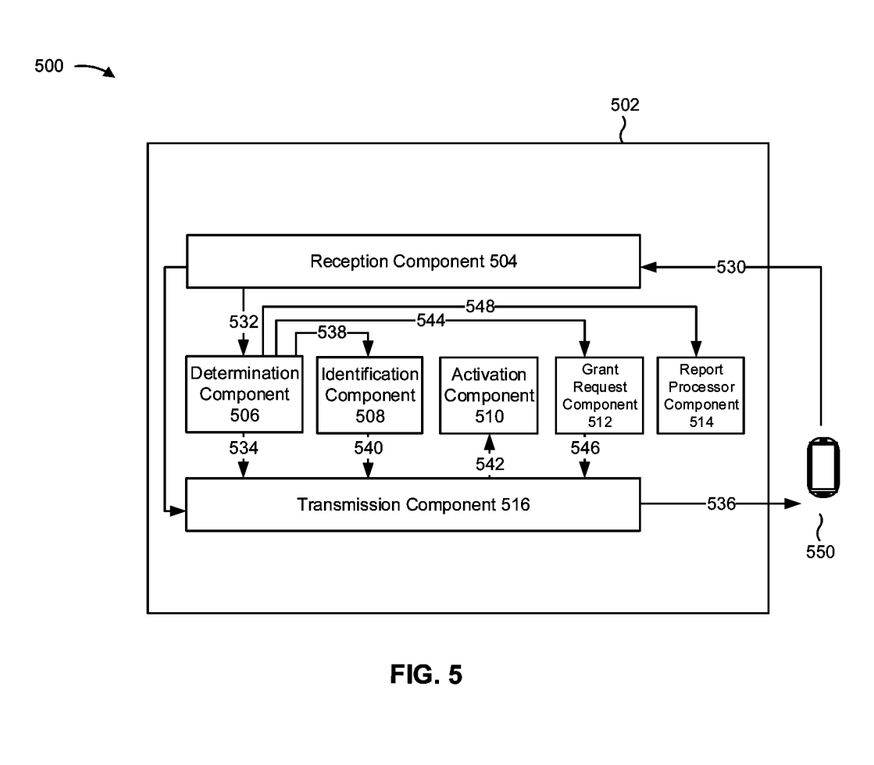
FIG. 5 is a conceptual data flow diagram illustrating data flow between different modules/means/components in an example apparatus, in accordance with various aspects of the present disclosure.

FIG. 5 is a conceptual data flow diagram 500 illustrating data flow between different modules/means/components in an example apparatus 502. The apparatus 502 may be a target UE (e.g., UE 120). In some aspects, the apparatus 502 includes a reception component 504, a determination component 506, an identification component 508, an activation component 510, a grant request component 512, a report processor component, 514, and/or a transmission component 516.

The reception component 504 may receive, from the UE 550 (e.g., a source UE) and as data 530, information associated with a CSI RS. For example, the reception component 504 may receive a CSI RS from the UE 550 and may perform a measurement to enable the apparatus 502 to provide a sidelink CSI report as a response.

The determination component 506 may receive, from the reception component 504, and as data 532, information associated with determining whether to perform CSI reporting as a response to the CSI RS. For example, the determination component 506 may receive information indicating an identifier of the UE 550. In this case, the determination component 506 may determine whether the identifier of the UE 550 is included in a list of identifiers of source UEs for which the apparatus is to perform CSI reporting. In this case, the determination component may provide, to the transmission component 516, and as data 534, information identifying a CSI report for transmission. The transmission component 516 may provide, to the UE 550 and as data 536, the CSI report.

In some aspects, based at least in part on determining to perform CSI reporting, the determination component 506 may provide, to the identification component 508, and as data 538, data associated with identifying a sidelink grant for transmission of a MAC CE to convey the CSI report. In this case, the identification component 508 may identify a sidelink grant, and may provide, to the transmission component 516 and as data 540, information indicating the grant to use for transmission of the MAC CE to convey the CSI report. In some aspects, based at least in part on the transmission component 516 transmitting the CSI report, the transmission component 516 may provide, to activation component 510 and as data 542, an indication of the transmission of the CSI report, which may cause the activation component 510 to activate a sidelink CSI report timer for the UE 550.

In some aspects, the determination component 506 may provide, to grant request component 512, and as data 544, information indicating that the apparatus 502 is to perform CSI reporting. In this case, the grant request component 512 may cause, using data 546, transmission component 516 to request a grant. Based at least in part on requesting the grant, the reception component 504 may receive an indication of the grant and may cause the transmission component 516 to transmit a MAC CE to convey the CSI report using the grant. In some aspects, the determination component 506 may determine a timeline for processing the CSI report, and may provide, to report processor component 514, and as data 548, information identifying the timeline. In this case, report processor component 514 may process the CSI RS to generate the CSI report in accordance with the CSI report.

The apparatus 502 may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Aspect 1: A method of wireless communication performed by a target user equipment (UE), comprising: receiving a channel state information (CSI) reference signal (RS) from a source UE via a sidelink communication; determining that a lower-layer determined source identifier of the source UE is included in a set of upper-layer determined source identifiers; and transmitting a CSI report in a media access control (MAC) control element (CE) as a response to the CSI RS, based at least in part on the determination that the lower-layer determined source identifier of the source UE is included in a set of upper-layer determined source identifiers.

Aspect 2: The method of aspect 1, wherein the CSI report includes information identifying at least one of: a hybrid automatic repeat request process identifier for the CSI RS, a channel quality indicator, a rank indicator, or a slot number on which the CSI RS was received.

Aspect 3: The method of any of aspects 1 to 2, further comprising: identifying a sidelink grant for transmission of the MAC CE, wherein the sidelink grant includes resources for the CSI report and a corresponding subheader; and wherein transmitting the CSI report comprises: transmitting the CSI report via the sidelink grant for transmission of the MAC CE in accordance with a logical channel prioritization.

Aspect 4: The method of aspect 3, further comprising: activating a sidelink CSI report timer in connection with the lower-layer determined source identifier based at least in part on the transmission of the CSI report.

Aspect 5: The method of any of aspects 1 to 4, wherein the transmission of the CSI report comprises: transmitting the CSI report based at least in part on a logical channel prioritization.

Aspect 6: The method of aspect 5, wherein the logical channel prioritization includes the CSI report being prioritized above a sidelink transport channel.

Aspect 7: The method of any of aspects 1 to 6, further comprising: requesting a grant for transmitting the CSI report; receiving the grant for transmitting the CSI report based at least in part on requesting the grant, wherein the grant includes resources for transmitting the MAC CE and a corresponding MAC subheader; and transmitting the CSI report using the grant.

Aspect 8: The method of aspect 7, wherein a transmission of the CSI report using the grant includes padding bits to fill the grant.

Aspect 9: The method of any of aspects 1 to 8, further comprising: determining a transmission window for transmitting the CSI report; and processing the CSI report in accordance with the transmission window.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:
1. A method of wireless communication performed by a target user equipment (UE), comprising:
receiving a channel state information (CSI) reference signal (RS) from a source UE via a sidelink communication;

determining that a lower-layer source identifier of the source UE is included in an upper-layer source identifier; and transmitting a sidelink CSI report in a media access control (MAC) control element (CE), as a response to the CSI RS, based at least in part on the lower-layer source identifier of the source UE being included in the upper-layer source identifier, wherein the transmission of the sidelink CSI report is prioritized above a sidelink transport channel.

2. The method of claim 1, wherein the sidelink CSI report includes information identifying at least one of:
a hybrid automatic repeat request process identifier for the CSI RS,
a channel quality indicator,
a rank indicator, or
a slot number on which the CSI RS was received.

3. The method of claim 1, further comprising:
identifying a sidelink grant for transmission of the MAC CE, wherein the sidelink grant includes resources for the sidelink CSI report and a corresponding subheader; and
wherein transmitting the sidelink CSI report comprises:
transmitting the sidelink CSI report via the sidelink grant for the transmission of the MAC CE in accordance with a logical channel prioritization.

4. The method of claim 3, further comprising:
activating a sidelink CSI report timer in connection with the lower-layer source identifier based at least in part on the transmission of the sidelink CSI report.

5. The method of claim 1, wherein transmitting the sidelink CSI report comprises:
transmitting the sidelink CSI report based at least in part on a logical channel prioritization.

6. The method of claim 1, further comprising:
requesting a grant for transmitting the sidelink CSI report; and
receiving the grant for transmitting the sidelink CSI report based at least in part on requesting the grant, wherein the grant includes resources for transmitting the MAC CE and a corresponding MAC subheader; and
wherein transmitting the sidelink CSI report comprises:
transmitting the sidelink CSI report using the grant.

7. The method of claim 6, wherein the transmission of the sidelink CSI report using the grant includes padding bits to fill the grant.

8. The method of claim 1, further comprising:
determining a transmission window for transmitting the sidelink CSI report; and
processing the sidelink CSI report in accordance with the transmission window.

9. A target user equipment (UE) for wireless communication, comprising:
a memory; and
one or more processors coupled to the memory, the one or more processors configured to:
receive a channel state information (CSI) reference signal (RS) from a source UE via a sidelink communication;
determine that a lower-layer source identifier of the source UE is included in an upper-layer source identifier; and
transmit a sidelink CSI report in a media access control (MAC) control element (CE) as a response to the CSI RS, based at least in part on the lower-layer source identifier of the source UE being included in the upper-layer source identifier,
wherein the transmission of the sidelink CSI report is prioritized above a sidelink transport channel.

10. The target UE of claim 9, wherein the sidelink CSI report includes information identifying at least one of:
a hybrid automatic repeat request process identifier for the CSI RS,
a channel quality indicator,
a rank indicator, or
a slot number on which the CSI RS was received.

11. The target UE of claim 9, wherein the one or more processors are further configured to:
identify a sidelink grant for transmission of the MAC CE, wherein the sidelink grant includes resources for the sidelink CSI report and a corresponding subheader; and
wherein the one or more processors, when transmitting the sidelink CSI report, are configured to:
transmit the sidelink CSI report via the sidelink grant for the transmission of the MAC CE in accordance with a logical channel prioritization.

12. The target UE of claim 9, wherein the one or more processors are further configured to:
activate a sidelink CSI report timer in connection with the lower-layer source identifier based at least in part on the transmission of the sidelink CSI report.

13. The target UE of claim 9, wherein the one or more processors, when transmitting the sidelink CSI report, are configured to:
transmit the sidelink CSI report based at least in part on a logical channel prioritization.

14. The target UE of claim 9, wherein the one or more processors are further configured to:
request a grant for transmitting the sidelink CSI report; and
receive the grant for transmitting the sidelink CSI report based at least in part on requesting the grant, wherein the grant includes resources for transmitting the MAC CE and a corresponding MAC subheader; and
wherein the one or more processors, when transmitting the sidelink CSI report, are configured to:
transmit the sidelink CSI report using the grant.

15. The target UE of claim 14, wherein the transmission of the sidelink CSI report using the grant includes padding bits to fill the grant.

16. The target UE of claim 9, wherein the one or more processors are further configured to:
determine a transmission window for transmitting the sidelink CSI report; and
process the sidelink CSI report in accordance with the transmission window.

17. A non-transitory computer-readable medium storing one or more instructions for wireless communication, the one or more instructions comprising:
one or more instructions that, when executed by one or more processors of a target user equipment (UE), cause the one or more processors to:
receive a channel state information (CSI) reference signal (RS) from a source UE via a sidelink communication;
determine that a lower-layer source identifier of the source UE is included in an upper-layer source identifier; and
transmit a sidelink CSI report in a media access control (MAC) control element (CE) as a response to the CSI RS, based at least in part on the lower-layer source identifier of the source UE being included in the upper-layer source identifier, wherein the transmission of the sidelink CSI report is prioritized above a sidelink transport channel.

18. The non-transitory computer-readable medium of claim 17, wherein the sidelink CSI report includes information identifying at least one of:
   a hybrid automatic repeat request process identifier for the CSI RS,
   a channel quality indicator,
   a rank indicator, or
   a slot number on which the CSI RS was received.

19. The non-transitory computer-readable medium of claim 17, wherein the one or more instructions further cause the target UE to:
   identify a sidelink grant for transmission of the MAC CE, wherein the sidelink grant includes resources for the sidelink CSI report and a corresponding subheader; and
   wherein the one or more instructions, that cause the target UE to transmit the sidelink CSI report, cause the target UE to:
      transmit the sidelink CSI report via the sidelink grant for the transmission of the MAC CE in accordance with a logical channel prioritization.

20. The non-transitory computer-readable medium of claim 19, wherein the one or more instructions further cause the target UE to:
   activate a sidelink CSI report timer in connection with the lower-layer source identifier based at least in part on the transmission of the sidelink CSI report.

21. The non-transitory computer-readable medium of claim 17, wherein the one or more instructions, that cause the target UE to transmit the sidelink CSI report, cause the target UE to:
   transmit the sidelink CSI report based at least in part on a logical channel prioritization.

22. The non-transitory computer-readable medium of claim 17, wherein the one or more instructions further cause the target UE to:
   request a grant for transmitting the sidelink CSI report; and
   receive the grant for transmitting the sidelink CSI report based at least in part on requesting the grant, wherein the grant includes resources for transmitting the MAC CE and a corresponding MAC subheader; and
   wherein the one or more instructions, that cause the target UE to transmit the sidelink CSI report, cause the target UE to:
      transmit the sidelink CSI report using the grant.

23. The non-transitory computer-readable medium of claim 22, wherein the transmission of the sidelink CSI report using the grant includes padding bits to fill the grant.

24. The non-transitory computer-readable medium of claim 17, wherein the one or more instructions further cause the target UE to:
   determine a transmission window for transmitting the sidelink CSI report; and
   process the sidelink CSI report in accordance with the transmission window.

25. An apparatus for wireless communication, comprising:
   means for receiving a channel state information (CSI) reference signal (RS) from a source user equipment (UE) via a sidelink communication;
   means for determining that a lower-layer source identifier of the source UE is included in an upper-layer source identifier; and
   means for transmitting a sidelink CSI report in a media access control (MAC) control element (CE) as a response to the CSI RS, based at least in part on the lower-layer source identifier of the source UE being included in the upper-layer source identifier,
      wherein the transmission of the sidelink CSI report is prioritized above a sidelink transport channel.

26. The apparatus of claim 25, wherein the means for transmitting the CSI sidelink report comprises:
   means for transmitting the sidelink CSI report based at least in part on a logical channel prioritization.

27. The apparatus of claim 25, wherein the sidelink CSI report includes information identifying at least one of:
   a hybrid automatic repeat request process identifier for the CSI RS,
   a channel quality indicator,
   a rank indicator, or
   a slot number on which the CSI RS was received.

28. The apparatus of claim 25, wherein the means for transmitting the sidelink CSI report comprises:
   means for transmitting the sidelink CSI report based at least in part on a logical channel prioritization.

29. The apparatus of claim 25, further comprising:
   means for requesting a grant for transmitting the sidelink CSI report; and
   means for receiving the grant for transmitting the sidelink CSI report based at least in part on requesting the grant, wherein the grant includes resources for transmitting the sidelink MAC CE and a corresponding MAC subheader; and
   wherein the means for transmitting the sidelink CSI report comprises:
      means for transmitting the sidelink CSI report using the grant.

30. The apparatus of claim 29, wherein the transmission of the sidelink CSI report using the grant includes padding bits to fill the grant.

* * * * *